United States Patent
Jiang (10) Patent No.: US 9,537,427 B2
(45) Date of Patent: Jan. 3, 2017

(54) PULSE-WIDTH MODULATION CONTROL OF PARALLELED INVERTERS

(71) Applicant: Hamilton Sundstrand Corporation, Windsor Locks, CT (US)

(72) Inventor: Dong Jiang, Manchester, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 232 days.

(21) Appl. No.: 14/291,940

(22) Filed: May 30, 2014

(65) Prior Publication Data

US 2015/0349662 A1  Dec. 3, 2015

(51) Int. Cl.
*H02M 7/5395* (2006.01)
*H02M 7/493* (2007.01)

(52) U.S. Cl.
CPC ........... *H02M 7/5395* (2013.01); *H02M 7/493* (2013.01)

(58) Field of Classification Search
CPC ......... H02M 7/5395; H02M 1/44; H02M 7/44
USPC ...................... 363/21.1, 41, 65, 71, 131, 132
See application file for complete search history.

(56) References Cited

U.S. PATENT DOCUMENTS

| | | | |
|---|---|---|---|
| 5,959,368 A | 9/1999 | Kubo et al. | |
| 6,088,246 A * | 7/2000 | Okuyama | H02M 7/53873 363/132 |
| 7,084,601 B2 * | 8/2006 | Maeda | G01R 1/203 318/803 |
| 7,327,588 B2 * | 2/2008 | Ollila | H02M 7/493 363/71 |
| 7,400,518 B2 * | 7/2008 | Yin | H02M 7/5395 363/132 |
| 7,589,984 B2 * | 9/2009 | Salomaki | H02M 1/126 363/41 |
| 7,773,396 B2 * | 8/2010 | Ollila | H02M 7/493 318/801 |
| 8,169,179 B2 * | 5/2012 | Mohan | H02M 5/271 318/722 |
| 8,270,191 B2 * | 9/2012 | Zhu | H02M 1/126 363/132 |

(Continued)

FOREIGN PATENT DOCUMENTS

CN  102142787 A  8/2011

OTHER PUBLICATIONS

European Search Report dated Oct. 15, 2015, for corresponding European Patent Application No. 12171059.4.

(Continued)

*Primary Examiner* — Timothy J Dole
*Assistant Examiner* — Htet Z Kyaw
(74) *Attorney, Agent, or Firm* — Kinney & Lange, P.A.

(57) ABSTRACT

A system includes a paralleled inverter circuit and a controller. The paralleled inverter circuit includes a first inverter and a second inverter. The controller is configured to control a first plurality of switches of the first inverter and a second plurality of switches of the second inverter based upon a control vector. The controller controls the paralleled inverter circuit using a first unit vector for a first time period and controls the paralleled inverter circuit using a second unit vector for a second time period. The first unit vector and the second unit vector are selected based upon the control vector, and the first time period and the second time period are determined based upon the control vector.

10 Claims, 5 Drawing Sheets (56) References Cited

U.S. PATENT DOCUMENTS

| | | | | |
|---|---|---|---|---|
| 8,503,207 B2* | 8/2013 | Tallam | ............... | H02M 1/12 |
| | | | | 363/37 |
| 8,564,994 B2* | 10/2013 | Capitaneanu | ......... | H02M 7/487 |
| | | | | 363/132 |
| 8,604,730 B2* | 12/2013 | Suzuki | ............... | H02M 1/14 |
| | | | | 318/400.02 |
| 8,649,195 B2* | 2/2014 | Mao | ............... | H02M 7/493 |
| | | | | 363/71 |
| 8,659,917 B2* | 2/2014 | Sakakibara | ......... | H02M 5/4585 |
| | | | | 363/132 |
| 8,958,222 B2* | 2/2015 | Hart | ............... | H02M 7/539 |
| | | | | 363/132 |
| 2003/0048005 A1 | 3/2003 | Goldin et al. | | |
| 2004/0062062 A1* | 4/2004 | Lee | ............... | H02M 7/797 |
| | | | | 363/37 |
| 2008/0024007 A1 | 1/2008 | Budampati et al. | | |
| 2011/0122661 A1* | 5/2011 | Sakakibara | ......... | H02M 5/4585 |
| | | | | 363/37 |
| 2015/0016155 A1* | 1/2015 | Lee | ............... | H02M 7/53875 |
| | | | | 363/44 |
| 2015/0194902 A1* | 7/2015 | Tian | ............... | H02M 5/458 |
| | | | | 363/37 |

OTHER PUBLICATIONS

Extended European Search Report dated Oct. 29, 2015, received for corresponding European Patent Application No. 15168247.3.

* cited by examiner

PULSE-WIDTH MODULATION CONTROL OF PARALLELED INVERTERS

BACKGROUND

The present invention relates generally to power inverters, and in particular to a system and method for controlling paralleled inverters using pulse-width modulation (PWM).

Three-phase inverters are often implemented within, for example, variable speed motor drives. Three-phase inverters are utilized, for example, to convert a direct current (DC) input into an alternating current (AC) output for a motor or other load that utilizes AC power. Prior art inverters were implemented as single stage inverters having a plurality of switches. The switches are selectively enabled and disabled to convert the DC input power into controlled AC output power.

Electromagnetic interference, or "noise," is a common problem in electrical circuit design. Noise may originate from natural sources, such as background radiation or lightning strikes, but the more common and more problematic noise is electromagnetic noise generated by components in electrical systems, such as three-phase inverters. EMI noise can be divided into two major groups: differential-mode (DM) EMI and common-mode (CM) EMI. CM noise creates several concerns such as conduction through bearings in the motor which may reduce the reliability of the motor. In prior art systems, CM filters containing, for example, CM chokes and CM capacitors are utilized to filter the CM noise. The weight of CM filters is dependent upon the CM voltage of the inverter. Different PWM schemes for inverter control can generate different CM voltage, but CM voltage cannot be eliminated for prior art two-level inverters. It is desirable to eliminate the CM output voltage of the inverter to eliminate the need for CM filters.

SUMMARY

A system includes a paralleled inverter circuit and a controller. The paralleled inverter circuit includes a first inverter and a second inverter. The controller is configured to control a first plurality of switches of the first inverter and a second plurality of switches of the second inverter based upon a control vector. The controller controls the paralleled inverter circuit using a first unit vector for a first time period and controls the paralleled inverter circuit using a second unit vector for a second time period. The first unit vector and the second unit vector are selected based upon the control vector, and the first time period and the second time period are determined based upon the control vector.

DETAILED DESCRIPTION

A power conversion system is disclosed herein that includes parallel inverters for producing zero common-mode (CM) voltage output. A controller controls the paralleled inverter using six unit vectors. Each unit vector, when utilized to control the paralleled inverter, provides negligible CM voltage at the paralleled inverter output. Because of this, no CM filter is required, reducing the overall weight and cost of the power conversion system. An output filter that includes coupling inductors is configured to filter differential-mode (DM) electromagnetic interference (EMI). The coupling inductors both constrain the circulation current from the paralleled inverter as well as filter the DM voltage.

Figure 1:
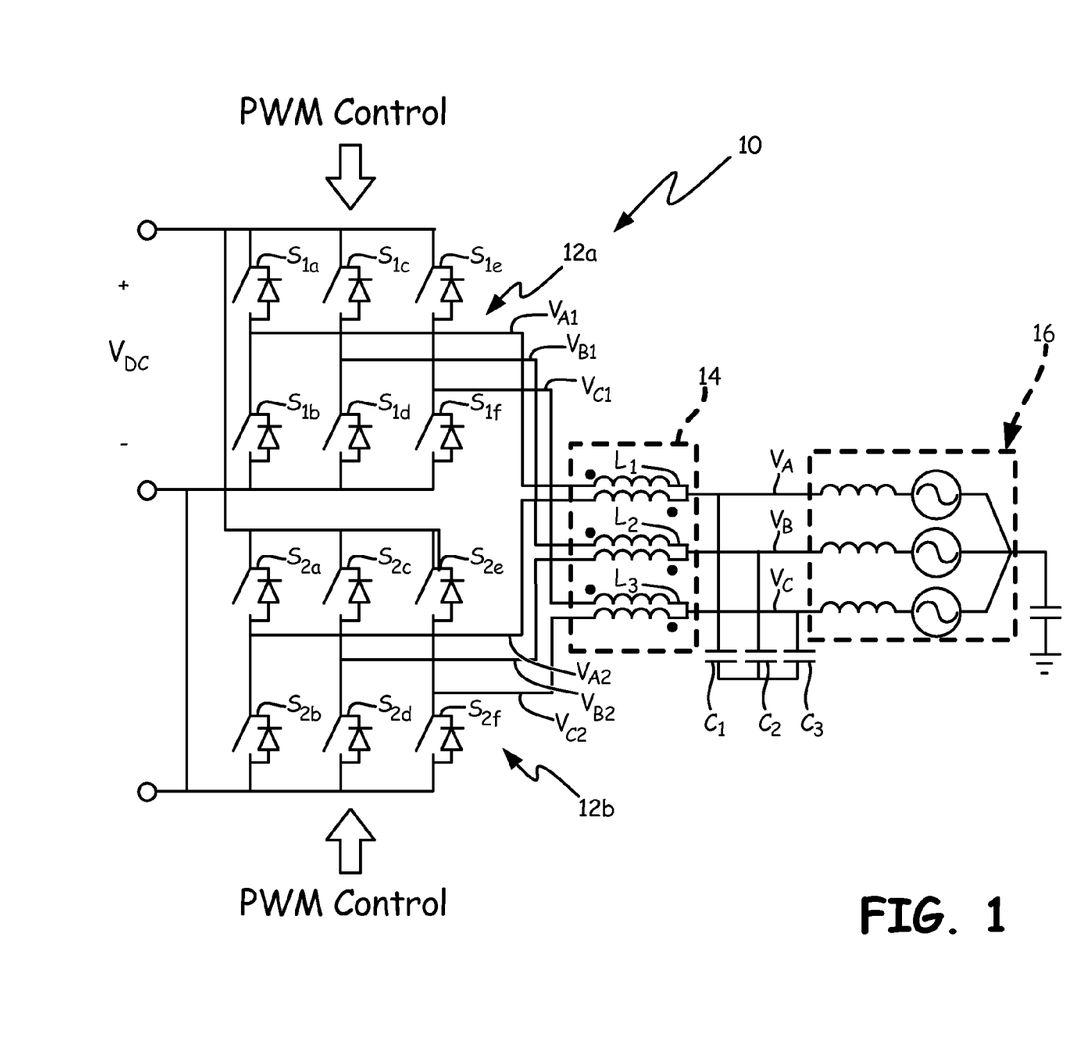
FIG. 1 is a circuit diagram illustrating a paralleled inverter that includes two inverters.

FIG. 1 is a circuit diagram illustrating paralleled inverter 10 that includes inverters 12a and 12b. Inverter 12a includes switches $S_{1a}$-$S_{1f}$ and inverter 12b includes switches $S_{2a}$-$S_{2f}$. The three phase outputs from inverters 12a and 12b are provided to coupling inductors 14 that include inductors $L_1$-$L_3$. Capacitors $C_1$-$C_3$ are connected between each phase output from coupling inductors 14 and a common point. The three phase outputs from coupling inductors 14 are provided to, for example, three-phase motor 16. Although illustrated as providing power to three-phase motor 16, paralleled inverter 10 may be utilized in any power conversion system to provide power for any AC load.

Inverters 12a and 12b are configured in a parallel configuration and both receive input from the $V_{DC}$ bus. The $V_{DC}$ bus provides direct current (DC) power to parallel inverter 10 from any DC source such as, for example, an active rectifier. Inverters 12a and 12b may both be configured as two level inverters. For example, with reference to a mid-point of the DC bus, for output $V_{A1}$, switch $S_{1a}$ may be enabled to provide +$V_{DC}$/2 to output $V_{A1}$ (positive DC bus voltage) and switch $S_{1b}$ may be enabled to provide −$V_{DC}$/2 to output $V_{A1}$ (negative DC bus voltage). For output $V_{A2}$, switch $S_{2a}$ may be enabled to provide +$V_{DC}$/2 to output $V_{A2}$, and switch $S_{2b}$ may be enabled to provide −$V_{DC}$/2 to output $V_{A2}$. $V_{A1}$ and $V_{A2}$ are both provided to coupling inductor $L_1$, which provides a single output $V_A$ to three-phase motor 16, constrains circulation current, and filters DM noise. Circulation currents are currents that flow from inverter 12a into inverter 12b or vice versa, for example, a circulating current may flow from output $V_{A1}$ into output $V_{A2}$. The same operation is performed for the other outputs $V_B$ and $V_C$. The three outputs $V_A$, $V_B$, and $V_C$ are provided to motor 16.

Figure 2A:
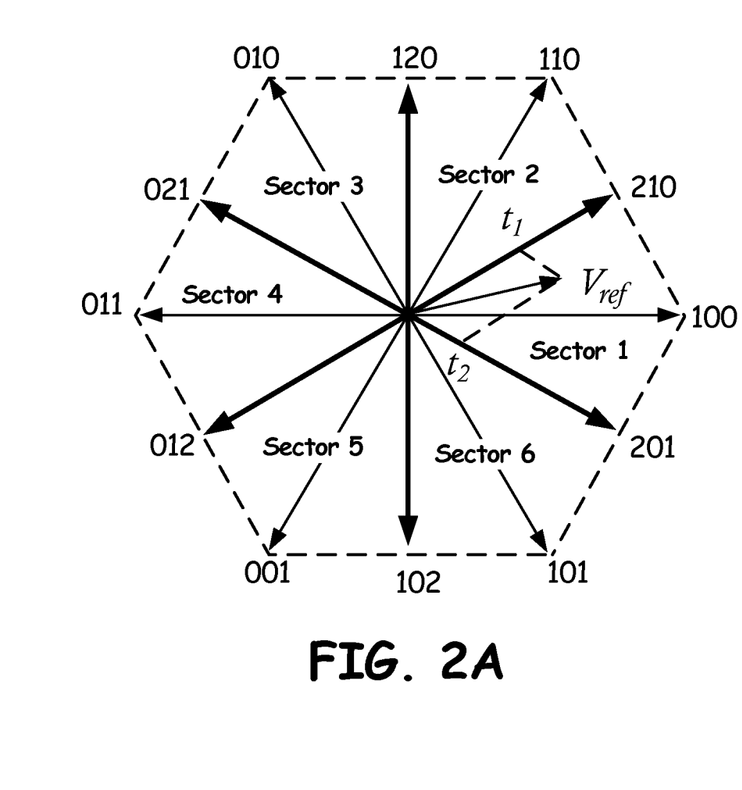
FIGS. 2A and 2B are vector diagrams illustrating control vectors for a paralleled inverter.
Figure 2B:
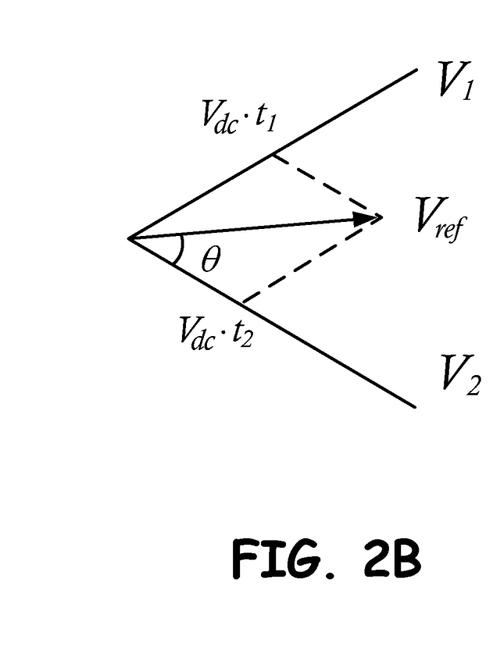

With continued reference to FIG. 1, FIGS. 2A and 2B are vector diagrams illustrating control vectors for paralleled inverter 10. In space vector pulse-width modulation (SVPWM) control, a two-dimensional control vector is utilized to control the output voltage of paralleled inverter 10. The control vector ($V_{ref}$) is generated based upon the desired three-phase output ($V_A$, $V_B$ and $V_C$) of paralleled inverter 10. $V_{ref}$ may be generated using any desired method, such as converting a desired three-phase output ($V_A$, $V_B$, and $V_C$) into a two-dimensional DQ or αβ reference frame using a Park and/or Clarke transformation. The resultant $V_{ref}$ control vector will fall into one of the six sectors shown in FIG. 2A. The transformation will also provide the angle θ of the position of $V_{ref}$.

In single two-stage inverters, the six unit vectors (0,0,1; 0,1,0; 0,1,1; 1,0,0; 1,0,1; and 1,1,0) as shown in FIG. 2A are utilized to control the inverter. For example, if the 0,1,0 unit vector is applied to inverter 12a, switches $S_{1b}$, $S_{1c}$, and $S_{1f}$ would be enabled to provide −$V_{DC}$/2 to the $V_{A1}$ output, $V_{DC}$/2 to the $V_{B1}$ output, and −$V_{DC}$/2 to the $V_{C1}$ output. Each of inverters 12a and 12b may be controlled utilizing these six single two-stage inverter unit vectors.

For paralleled inverter 10, six new unit vectors (1,0,2; 2,0,1; 2,1,0; 1,2,0; 0,2,1; and 0,1,2), as shown in FIG. 2A, may be utilized as combinations of adjacent single inverter unit vectors. For example, paralleled inverter unit vector 1,0,2 is formed through combination of single inverter unit vectors 0,0,1 and 1,0,1, and paralleled inverter unit vector 2,0,1 is formed through combination of single inverter unit vectors 1,0,1 and 1,0,0. For unit vector 2,0,1, for example, inverter 12*a* may be controlled using single inverter unit vector 1,0,1, and inverter 12*b* may be controlled using single inverter unit vector 1,0,0. Additionally, inverter 12*a* may be controlled using single inverter unit vector 1,0,0, and inverter 12*b* may be controlled using single inverter unit vector 1,0,1.

When controlled using the six new unit vectors (1,0,2; 2,0,1; 2,1,0; 1,2,0; 0,2,1; and 0,1,2), parallel inverter 10 produces zero or negligible CM voltage on outputs $V_A$-$V_C$. This negligible CM voltage may be, for example, less than one percent of $V_{DC}$. The following equation is used to calculate the CM voltage produced on outputs $V_A$-$V_C$:

$$V_{CM} = (1/3)(V_A + V_B + V_C) = (1/6)(V_{A1} + V_{A2} + V_{B1} + V_{B2} + V_{C1} + V_{C2}) \quad (1)$$

As seen in equation (1), with a single stage inverter, where each phase produces an output of either $+V_{DC}/2$ or $-V_{DC}/2$, there will be a nonzero CM voltage output due to the odd number of outputs. With parallel inverter 10 that includes six outputs, it is possible to eliminate the CM output due to the even number of outputs. The six new unit vectors always provide an output such that $V_{CM}$ is equal to zero. For example, if paralleled inverter 10 is controlled using unit vector 1,0,2, inverter 12*a* may be controlled with single inverter unit vector 0,0,1, and inverter 12*b* may be controlled with single inverter unit vector 1,0,1. In this case, switches $S_{1b}$, $S_{1d}$, $S_{1e}$, $S_{2a}$, $S_{2d}$, and $S_{2e}$ would be enabled providing zero volts on $V_A$, $-V_{DC}$ on $V_B$, and $+V_{DC}$ on $V_C$, which provides zero CM voltage between $V_A$, $V_B$, and $V_C$.

FIG. 2B illustrates a sample control vector $V_{ref}$ that is utilized to control inverters 12*a* and 12*b* to obtain a desired output ($V_A$, $V_B$, and $V_C$). In SVPWM control, a control vector is produced based upon a desired three-phase output ($V_A$, $V_B$, and $V_C$). The control vector may be generated using any method, such as a Park and/or Clarke transformation. The control vector will fall somewhere within the vector diagram shown in FIG. 2A. In FIGS. 2A and 2B, a sample control vector $V_{ref}$ is shown in Sector 1. For the sample control vector $V_{ref}$ shown in FIG. 2A, vector $V_1$ of FIG. 2B corresponds to new unit vector 2,1,0, and vector $V_2$ of FIG. 2B corresponds to new vector 2,0,1. The angle $\theta$ is the angle between new unit vector $V_2$ and control vector $V_{ref}$.

As shown in FIG. 2A, control vector $V_{ref}$ may be obtained by operating parallel inverter 10 utilizing unit vector 2,1,0 for a first time period $t_1$, and operating parallel inverter 10 utilizing unit vector 2,0,1 for a second time period $t_2$. Because $t_1$ and $t_2$ may not equal an entire switching period $T_S$, another time period, $t_0$, is determined for which the outputs $V_A$, $V_B$, and $V_C$ will all be zero. This is achieved by utilizing zero unit vectors 1,1,1 and 0,0,0, or vice versa, to control inverters 12*a* and 12*b*, respectively. The following equations may be utilized to determine values for $t_0$, $t_1$, and $t_2$ based upon the positive DC rail voltage $+V_{DC}$, the angle $\theta$, and the magnitude of the control vector $V_{ref}$.

$$\begin{cases} \dfrac{V_{dc} \cdot t_1}{\sin\theta} = \dfrac{V_{dc} \cdot t_2}{\sin\left(\dfrac{\pi}{3} - \theta\right)} = \dfrac{V_{ref} \cdot T_s}{\sin\left(\dfrac{2\pi}{3}\right)} \\ t_0 = T_s - t_1 - t_2 \end{cases} \quad (2)$$

Following determination of $t_0$, $t_1$, and $t_2$, inverters 12*a* and 12*b* may be controlled to provide the desired output indicated by control vector $V_{ref}$. The switching period $T_S$ may be split into two half cycles. Each half cycle may include half of each of $t_0$, $t_1$ and $t_2$. For example, the progression for each cycle may be $t_0/4$, $t_1/2$, $t_2/2$, $t_0/2$, $t_1/2$, $t_2/2$, and $t_0/4$. For example, if paralleled inverter 10 is controlled using unit vector 1,2,0 for period $t_1$, then inverter 12*a* may be controlled with single inverter unit vector 0,1,0 and inverter 12*b* may be controlled with single inverter unit vector 1,1,0 for the first half of period $t_1$. For the second half of period $t_1$, inverter 12*a* may be controlled with single inverter unit vector 1,1,0 and inverter 12*b* may be controlled with single inverter unit vector 0,1,0. This provides balance for each switching cycle $T_S$, which balances the circulating current through paralleled inverter 10 which may then be easily limited by coupling inductors 14.

Based upon the sector in which $V_{ref}$ is located, the following tables may be utilized to determine the desired control of inverters 12*a* and 12*b* for a given switching cycle $T_S$.

TABLE 1

| Sector One | Inverter 12a | Inverter 12b |
|---|---|---|
| $t_0/4$ | 1, 1, 1 | 0, 0, 0 |
| $t_1/2$ | 1, 1, 0 | 1, 0, 0 |
| $t_2/2$ | 1, 0, 0 | 1, 0, 1 |
| $t_0/2$ | 0, 0, 0 | 1, 1, 1 |
| $t_1/2$ | 1, 0, 0 | 1, 1, 0 |
| $t_2/2$ | 1, 0, 1 | 1, 0, 0 |
| $t_0/4$ | 1, 1, 1 | 0, 0, 0 |

TABLE 2

| Sector Two | Inverter 12a | Inverter 12b |
|---|---|---|
| $t_0/4$ | 1, 1, 1 | 0, 0, 0 |
| $t_1/2$ | 1, 1, 0 | 0, 1, 0 |
| $t_2/2$ | 1, 0, 0 | 1, 1, 0 |
| $t_0/2$ | 0, 0, 0 | 1, 1, 1 |
| $t_1/2$ | 0, 1, 0 | 1, 1, 0 |
| $t_2/2$ | 1, 1, 0 | 1, 0, 0 |
| $t_0/4$ | 1, 1, 1 | 0, 0, 0 |

TABLE 3

| Sector Three | Inverter 12a | Inverter 12b |
|---|---|---|
| $t_0/4$ | 1, 1, 1 | 0, 0, 0 |
| $t_1/2$ | 0, 1, 1 | 0, 1, 0 |
| $t_2/2$ | 0, 1, 0 | 1, 1, 0 |
| $t_0/2$ | 0, 0, 0 | 1, 1, 1 |
| $t_1/2$ | 0, 1, 0 | 0, 1, 1 |
| $t_2/2$ | 1, 1, 0 | 0, 1, 0 |
| $t_0/4$ | 1, 1, 1 | 0, 0, 0 |

TABLE 4

| Sector Four | Inverter 12a | Inverter 12b |
|---|---|---|
| $t_0/4$ | 1, 1, 1 | 0, 0, 0 |
| $t_1/2$ | 0, 1, 1 | 0, 0, 1 |
| $t_2/2$ | 0, 1, 0 | 0, 1, 1 |
| $t_0/2$ | 0, 0, 0 | 1, 1, 1 |
| $t_1/2$ | 0, 0, 1 | 0, 1, 1 |
| $t_2/2$ | 0, 1, 1 | 0, 1, 0 |
| $t_0/4$ | 1, 1, 1 | 0, 0, 0 |

TABLE 5

| Sector Five | Inverter 12a | Inverter 12b |
|---|---|---|
| $t_0/4$ | 1, 1, 1 | 0, 0, 0 |
| $t_1/2$ | 1, 0, 1 | 0, 0, 1 |
| $t_2/2$ | 0, 0, 1 | 0, 1, 1 |
| $t_0/2$ | 0, 0, 0 | 1, 1, 1 |
| $t_1/2$ | 0, 0, 1 | 1, 0, 1 |
| $t_2/2$ | 0, 1, 1 | 0, 0, 1 |
| $t_0/4$ | 1, 1, 1 | 0, 0, 0 |

TABLE 6

| Sector Six | Inverter 12a | Inverter 12b |
|---|---|---|
| $t_0/4$ | 1, 1, 1 | 0, 0, 0 |
| $t_1/2$ | 1, 0, 1 | 1, 0, 0 |
| $t_2/2$ | 0, 0, 1 | 1, 0, 1 |
| $t_0/2$ | 0, 0, 0 | 1, 1, 1 |
| $t_1/2$ | 1, 0, 0 | 1, 0, 1 |
| $t_2/2$ | 1, 0, 1 | 0, 0, 1 |
| $t_0/4$ | 1, 1, 1 | 0, 0, 0 |

As shown in Tables 1-6, each phase of each inverter 12a and 12b only changes state twice each switching cycle (i.e. from a '0' to a '1' or from a '1' to a '0'). In past SVPWM controlled two-level inverters, the sequence progressed $t_0/4$, $t_1/2$, $t_2/2$, $t_0/2$, $t_2/2$, $t_1/2$, and $t_0/4$ for symmetry in each half of the switching cycle ($T_S/2$). With paralleled inverter 10 producing no CM output voltage, each half of the switching cycle does not need to be symmetric, and the sequence may progress as shown in Tables 1-6 to achieve minimum switching events for each phase of paralleled inverter 10.

Figure 3:
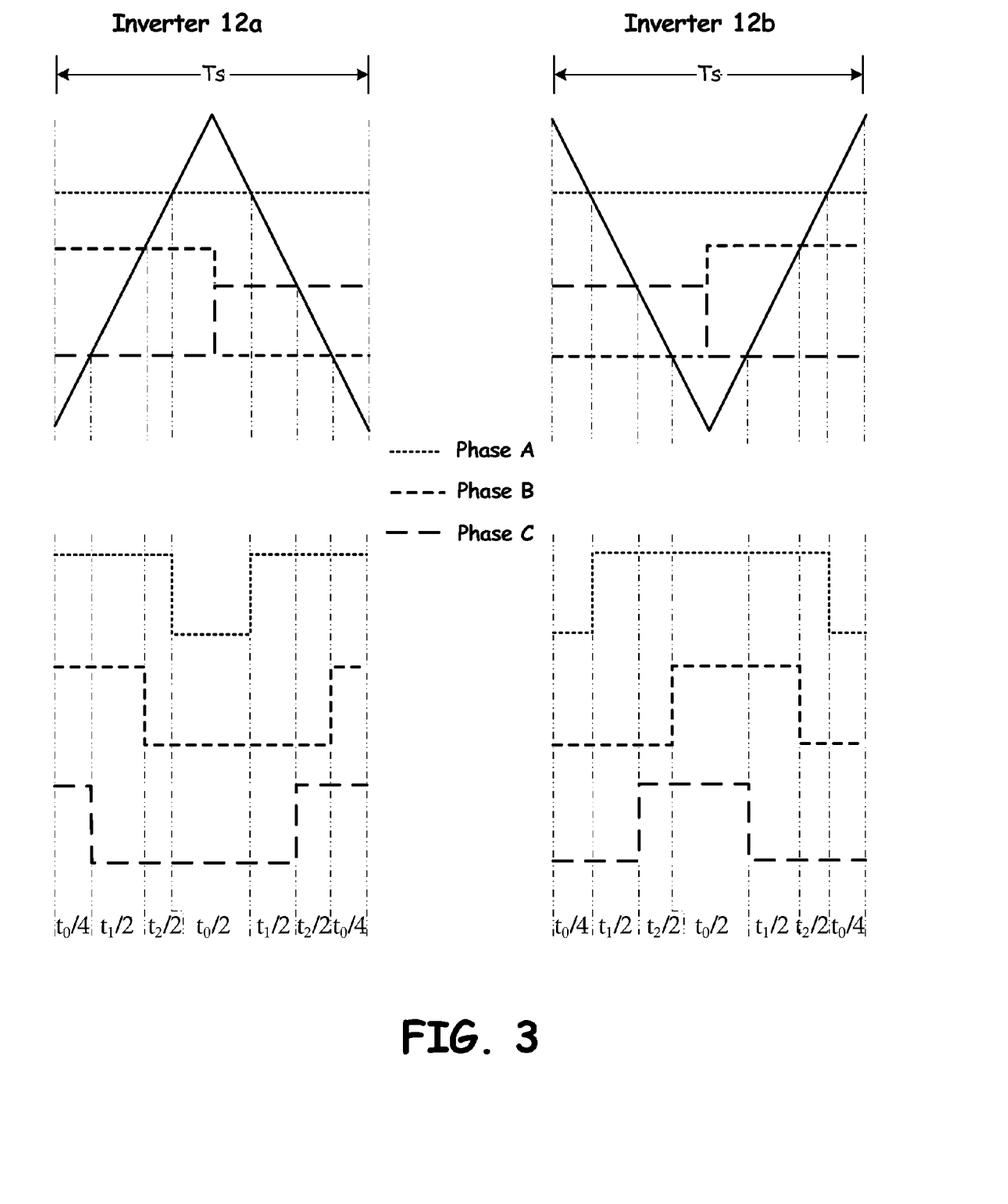
FIG. 3 is a chart illustrating gate pulse generation for a switching cycle of a paralleled inverter.
Figure 4:
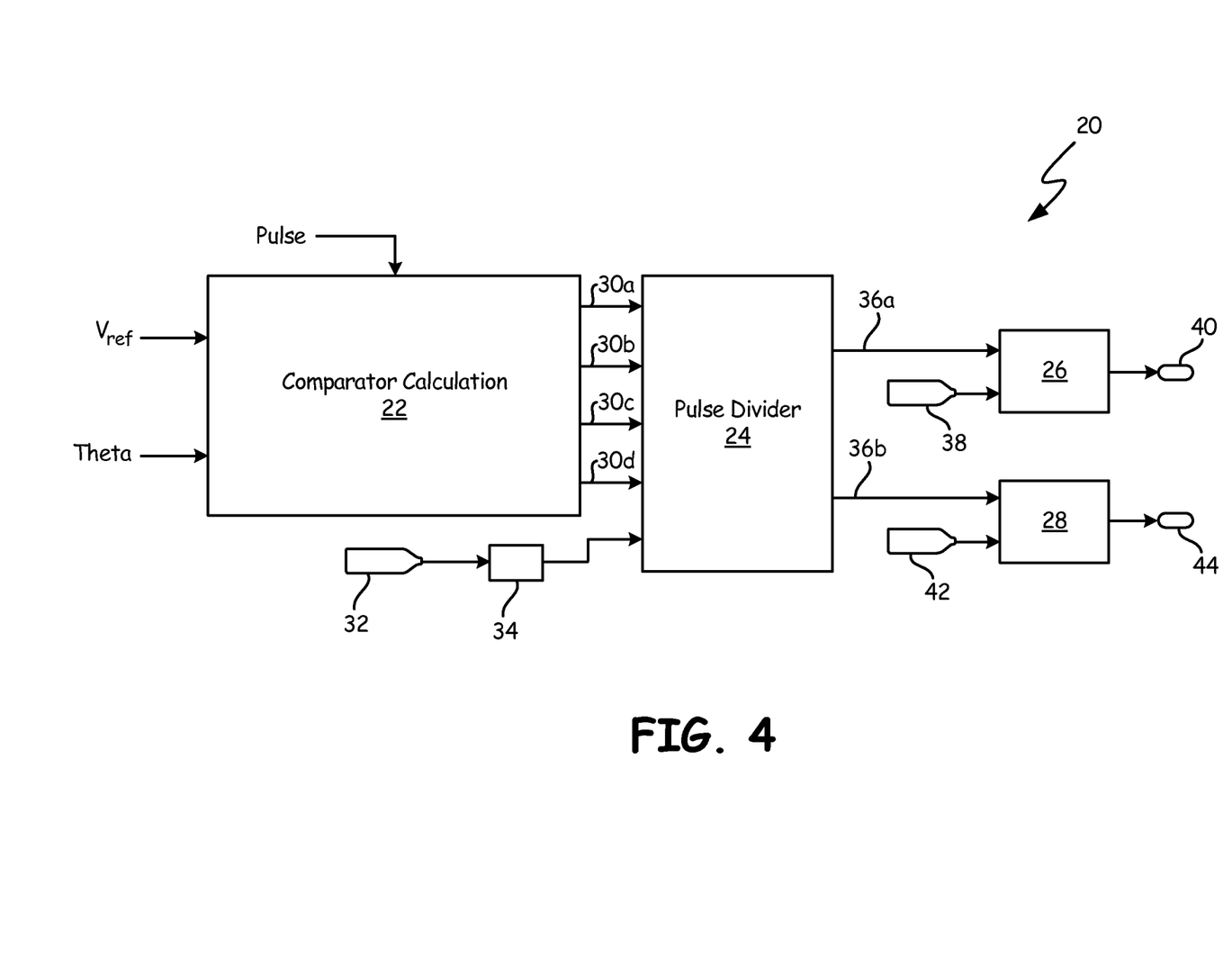
FIG. 4 is a block diagram illustrating a pulse-width modulation control system for a paralleled inverter.

With continued reference to FIG. 1 and FIGS. 2A and 2B, FIG. 3 a chart illustrating control waveforms in a switching cycle ($T_S$) for a paralleled inverter that produces a zero CM voltage output in sector 1 (Table 1). The top waveform illustrates comparator waveforms and a triangle-wave carrier signal. The waveforms shown in FIG. 3 are for a control vector $V_{ref}$ in sector one as illustrated in FIG. 2A. Because the two half cycles of $T_S$ are not symmetrical, some of the comparator signals include a step up or down at the half cycle. The comparator signals may be utilized to generate the control signals for each of inverters 12a and 12b. The comparator signals shown in FIG. 3 are compared to the triangle-wave carrier signal to generate a control signal for each phase. The control signals are illustrated in the bottom waveform of FIG. 3 and correspond to the values shown in Table 1. For control vectors that fall in the other sectors, comparator signals will be generated that will be utilized to generate the control signals indicated in a respective Table 2-6.

With continued reference to FIGS. 1-3, FIG. 4 is a block diagram illustrating a controller 20 for paralleled inverter 10. Control system 20 includes comparator calculator 22, pulse divider 24, and PWM calculators 26 and 28. Comparator calculator 22 provides outputs 30a-30d to pulse divider 24. Pulse divider 24 receives input from triangle-wave carrier input 32 through derivative module 34. Pulse divider 24 provides output 36a to PWM calculator 26 and provides output 36b to PWM calculator 28. PWM calculator 26 receives input from triangle-wave carrier input 38 and provides PWM output 40. PWM calculator 28 receives input from triangle-wave carrier input 42 and provides PWM output 44. Control system 20 may be implemented as any electronic system capable of providing control signals for inverters 12a and 12b. Control system 20 may be, for example, implemented in software and run on a microprocessor, may be implemented as discrete electronic components, or as any other electronic system.

Comparator 22 receives a control vector $V_{ref}$ and angle θ from, for example, a separate controller, or the same controller that implements control system 20. Comparator 22 determines values for $t_0$, $t_1$ and $t_2$ using, for example, equation (2). Following determination of $t_0$, $t_1$, and $t_2$, based upon the sector in which $V_{ref}$ falls, comparator 22 produces the comparator signals illustrated in FIG. 3, based upon the respective tables 1-6. Comparator 22 generates a first set of comparator values 30a for inverter 12a, a second set of comparator values 30b for inverter 12a, a first set of comparator values 30c for inverter 12b, and a second set of comparator values 30d for inverter 12b. The first set for each of inverters 12a and 12b are comparator values for a first half cycle of a switching period $T_S$, and the second set for each of inverters 12a and 12b are comparator values for a second half cycle of the switching period $T_S$.

Pulse divider 24 receives the four sets of comparator values 30a-30d and also receives an input from derivative module 34. The input is indicative of a change in triangle carrier wave input 32. In this way, pulse divider 24 is able to determine the present half cycle of $T_S$. Based upon the present half cycle of TS, pulse divider 24 provides the respective comparator signals to PWM calculators 26 and 28. PWM calculator 26 compares the comparator signals with a triangle-wave carrier input signal from input 38 and PWM calculator 28 compares the comparator signals with a triangle-wave carrier input signal from input 42. This comparison is illustrated in FIG. 3. PWM calculator 26 provides control signals (shown in FIG. 3) for inverter 12a on PWM output 40 based upon the comparison, and PWM calculator 28 provides control signals (shown in FIG. 3) for inverter 12b on PWM output 44 based upon the comparison. PWM calculators 26 and 28 may be implemented as any circuit capable of comparing two values and may be implemented as electronic comparators, or in software.

Figure 5:
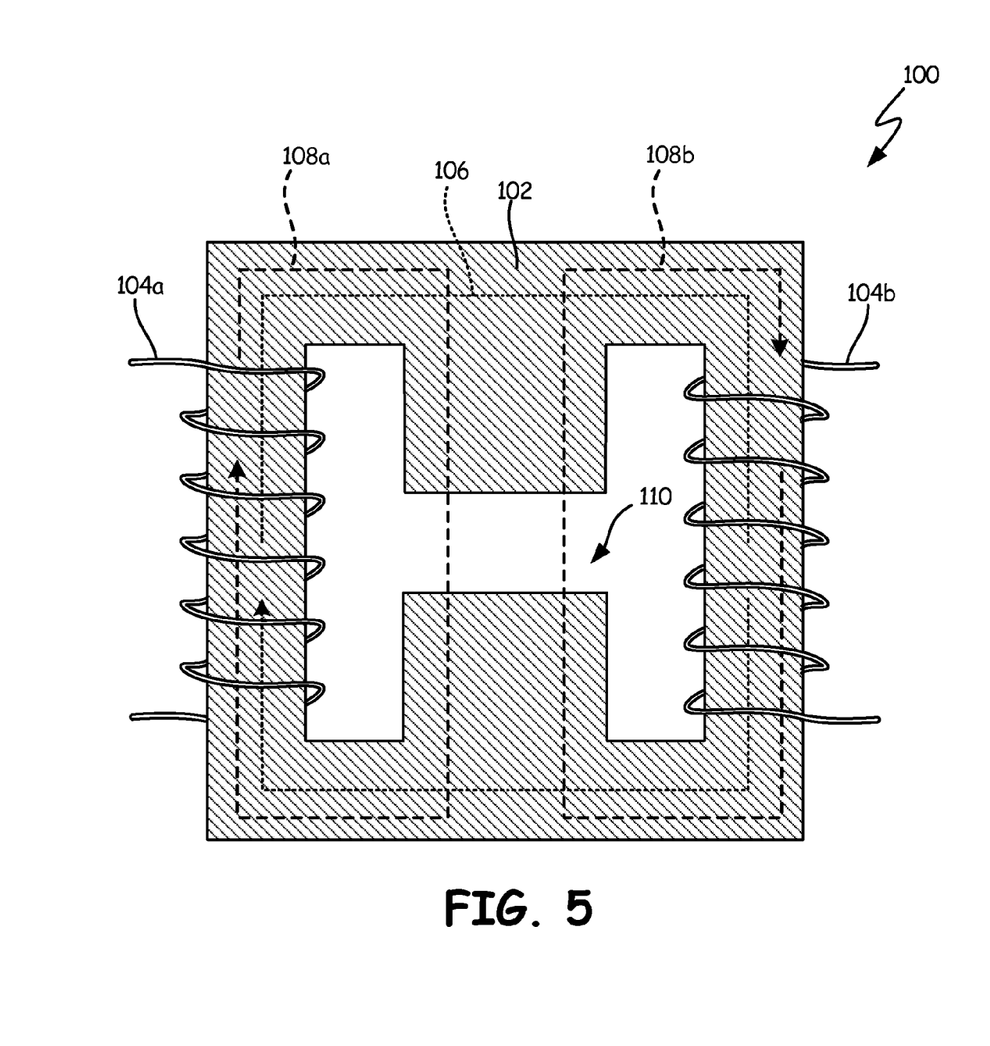
FIG. 5 is a schematic diagram illustrating a coupling inductor for use in an output of a paralleled inverter.

With continued reference to FIGS. 1-4, FIG. 5 is a schematic diagram illustrating coupling inductor 100 for use in coupling inductors 14 (FIG. 1) at the output of paralleled inverter 10 (FIG. 1). Inductor 100 includes core 102 and windings 104a and 104b. Coupling inductor flux path 106 and leakage inductor flux paths 108a and 108b. As illustrated in FIG. 5, core 102 may be two 'E' cores with an air gap 110 in the central leg.

Windings 104a and 104b are wound around opposing legs, in inversed directions. For example, a positive current through winding 104a will flow in the opposite direction of a positive current in winding 104b. Winding 104a may be connected to one of the phase outputs ($V_{A1}$, $V_{B1}$, $V_{C1}$) of inverter 12a, and winding 104b may be connected to one of the phase outputs ($V_{A2}$, $V_{B2}$, $V_{C2}$) of inverter 12b. The outputs of windings 104a and 104b may be connected to form primary outputs ($V_A$, $V_B$, $V_C$) provided to motor 16.

Flux path 106 shows the coupling inductor flux, which flows through the path that does not include air gap 110. Flux paths 108a and 108b illustrate the leakage inductor flux, which flows through air gap 110. Coupling inductor flux 106 is generated by the circulating current between inverters 12a and 12b, and is utilized to limit this circulating current. Leakage inductor flux 108a and 108b is generated by the output current from inverters 12a and 12b, and this inductance is used to filter DM noise. Using coupling inductor 100, the density of coupling inductors $L_1$-$L_3$ (FIG. 1) can be high and can perform as both a DM filter as well as a circulating current control.

By utilizing paralleled inverter 10 with coupling inductors 14 and capacitors $C_1$-$C_3$, a power conversion system may be implemented that produces negligible CM voltage. Because of this, prior art CM chokes and CM capacitors may be eliminated from the circuit, which greatly improves the power density of the system. By eliminating CM output of paralleled inverter 10, the CM current received by motor 16 is greatly reduced, which protects the insulation and bearings of motor 16, and may increase the life span and reliability of motor 16. Eliminating the CM voltage may also limit output current ripple, odd harmonics of the switching frequency, and DC capacitor ripple currents. Paralleled inverter 10 also provides fault-tolerant control in that the system may still function upon failure of one of inverters 12a or 12b.

Discussion of Possible Embodiments

The following are non-exclusive descriptions of possible embodiments of the present invention.

A system includes a paralleled inverter circuit and a controller. The paralleled inverter circuit includes a first inverter and a second inverter. The controller is configured to control a first plurality of switches of the first inverter and a second plurality of switches of the second inverter based upon a control vector. The controller controls the paralleled inverter circuit using a first unit vector for a first time period and controls the paralleled inverter circuit using a second unit vector for a second time period. The first unit vector and the second unit vector are selected based upon the control vector, and the first time period and the second time period are determined based upon the control vector.

A further embodiment of the foregoing system, wherein the controller controls the paralleled inverter circuit using a zero unit vector for a third time period, wherein a sum of the first time period, the second time period and the third time period equals a switching period.

A further embodiment of any of the foregoing systems, wherein each of the first plurality of switches and each of the second plurality of switches change state no more than two times per switching period.

A further embodiment of any of the foregoing systems, wherein the controller includes a signal calculator configured to determine the first time period, the second time period, and the third time period based upon the control vector, and wherein the signal calculator generates a plurality of comparator signals.

A further embodiment of any of the foregoing systems, wherein the controller further comprises a pulse divider, and wherein the plurality of comparator signals includes a first set of comparator signals and a second set of comparator signals, and wherein the pulse divider selects the first set of comparator signals during a first half of the switching period and selects the second set of comparator signals during a second half of the switching period.

A further embodiment of any of the foregoing systems, wherein the controller further comprises first and second pulse-width modulation calculators, and wherein the first pulse-width modulation calculator generators a first set control signals for the first plurality of switches based upon comparison of the plurality of comparator signals and a first triangle-wave carrier signal, and wherein the second pulse-width modulation calculator generates a second set of control signals for the second plurality of switches based upon comparison of the comparator signals and a second triangle-wave carrier signal.

A further embodiment of any of the foregoing systems, wherein the first inverter provides a first three-phase output and the second inverter provides a second three-phase output, and wherein the first three-phase output and the second-three phase output are connected by a plurality of coupling inductors.

A further embodiment of any of the foregoing systems, wherein a three-phase output of the plurality of coupling inductors is provided to drive an alternating current load.

A further embodiment of any of the foregoing systems, wherein a plurality of capacitors are connected between each of the three-phase output of the plurality of coupling inductors to filter differential-mode noise.

A method of controlling a paralleled inverter circuit for a switching period, wherein the paralleled inverter circuit is controlled based upon a control vector indicative of a desired output of the paralleled inverter circuit. The method includes selecting a first unit vector based upon the control vector, selecting a second unit vector based upon the control vector, determining, using a controller, a first time period and a second time period based upon the control vector, controlling, using the controller, the paralleled inverter circuit using the first unit vector for the first time period, and controlling, using the controller, the paralleled inverter circuit using the second unit vector for the second time period.

A further embodiment of the foregoing method, further including controlling, using the controller, the paralleled inverter circuit using a zero unit vector for a third time period, wherein the sum of the first time period, the second time period, and the third time period is equal to the switching period.

A further embodiment of any of the foregoing methods, wherein controlling, using the controller, the paralleled inverter circuit using the first unit vector for the first time period includes controlling, using the controller, the first inverter using a third unit vector for a first half of the first time period, controlling, using the controller, the second inverter using a fourth unit vector for the first half of the first time period, wherein the third unit vector and the fourth unit vector combine to form the first unit vector, controlling, using the controller, the first inverter using the fourth unit vector for a second half of the first time period, and controlling, using the controller, the second inverter using the third unit vector for the second half of the first time period.

A further embodiment of any of the foregoing methods, wherein controlling, using the controller, the paralleled inverter circuit using the second unit vector for the second time period includes controlling, using the controller, the first inverter using a fifth unit vector for a first half of the second time period, controlling, using the controller, the second inverter using a sixth unit vector for the first half of the second time period, wherein the fifth unit vector and the sixth unit vector combine to form the second unit vector, controlling, using the controller, the first inverter using the sixth unit vector for a second half of the second time period, and controlling, using the controller, the second inverter using the fifth unit vector for the second half of the second time period.

A further embodiment of any of the foregoing methods, wherein controlling, using the controller, the paralleled inverter circuit using a zero unit vector for a third time period includes controlling, using the controller, the first inverter using a first zero unit vector for a first half of the third time period, controlling, using the controller, the second inverter using a second zero unit vector for the first half of the third time period, controlling, using the controller, the first inverter using the second zero unit vector for a second half of the third time period, and controlling, using the controller, the second inverter using the first zero unit vector for the second half of the second time period.

A further embodiment of any of the foregoing methods, further including filtering, using a plurality of coupling inductors, each phase of a three-phase output of the paralleled inverter circuit, and providing the three-phase output of the paralleled inverter circuit to drive an alternating current load.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
a paralleled inverter circuit that includes a first inverter and a second inverter; and
a controller configured to control a first plurality of switches of the first inverter and a second plurality of switches of the second inverter based upon a control vector;
wherein the controller controls the paralleled inverter circuit using a first unit vector for a first time period, controls the paralleled inverter circuit using a second unit vector for a second time period, and controls the paralleled inverter circuit using a zero unit vector for a third time period, and wherein the sum of the first time period, the second time period and the third time period equals a switching period and wherein the controller comprises:
a signal calculator configured to determine the first time period, the second time period, and the third time period based upon the control vector, wherein the signal calculator generates a plurality of comparator signals; and
a pulse divider, wherein the plurality of comparator signals includes a first set of comparator signals and a second set of comparator signals, and wherein the pulse divider selects the first set of comparator signals during a first half of the switching period and selects the second set of comparator signals during a second half of the switching period; and
wherein the first unit vector and the second unit vector are selected based upon the control vector, and the first time period and the second time period are determined based upon the control vector.

2. The system of claim 1, wherein each of the first plurality of switches and each of the second plurality of switches change state no more than two times per switching period.

3. The system of claim 1, wherein the controller further comprises first and second pulse-width modulation calculators, and wherein the first pulse-width modulation calculator generators a first set control signals for the first plurality of switches based upon comparison of the plurality of comparator signals and a first triangle-wave carrier signal, and wherein the second pulse-width modulation calculator generates a second set of control signals for the second plurality of switches based upon comparison of the comparator signals and a second triangle-wave carrier signal.

4. The system of claim 1, wherein the first inverter provides a first three-phase output and the second inverter provides a second three-phase output, and wherein the first three-phase output and the second-three phase output are connected by a plurality of coupling inductors.

5. The system of claim 1, wherein a three-phase output of the plurality of coupling inductors is provided to drive an alternating current load.

6. The system of claim 4, wherein a plurality of capacitors are connected between each of the three-phase output of the plurality of coupling inductors to filter differential-mode noise.

7. A method of controlling a paralleled inverter circuit for a switching period, wherein the paralleled inverter circuit that includes a first inverter and a second inverter is controlled based upon a control vector indicative of a desired output of the paralleled inverter circuit, the method comprising:
selecting a first unit vector based upon the control vector;
selecting a second unit vector based upon the control vector;
determining, using a controller, a first time period and a second time period based upon the control vector;
controlling, using the controller, the paralleled inverter circuit using the first unit vector for the first time period, wherein controlling, using the controller, the paralleled inverter circuit using the first unit vector for the first time period comprises:
controlling, using the controller, the first inverter using a third unit vector for a first half of the first time period;
controlling, using the controller, the second inverter using a fourth unit vector for the first half of the first time period, wherein the third unit vector and the fourth unit vector combine to form the first unit vector;
controlling, using the controller, the first inverter using the fourth unit vector for a second half of the first time period; and controlling, using the controller, the second inverter using the third unit vector for the second half of the first time period;
controlling, using the controller, the paralleled inverter circuit using the second unit vector for the second time period; and
controlling, using the controller, the paralleled inverter circuit using a zero unit vector for a third time period, wherein the sum of the first time period, the second time period, and the third time period is equal to the switching period.

8. The method of claim 7, wherein controlling, using the controller, the paralleled inverter circuit using the second unit vector for the second time period comprises:
controlling, using the controller, the first inverter using a fifth unit vector for a first half of the second time period;
controlling, using the controller, the second inverter using a sixth unit vector for the first half of the second time period, wherein the fifth unit vector and the sixth unit vector combine to form the second unit vector;
controlling, using the controller, the first inverter using the sixth unit vector for a second half of the second time period; and
controlling, using the controller, the second inverter using the fifth unit vector for the second half of the second time period.

9. The method of claim 8, wherein controlling, using the controller, the paralleled inverter circuit using a zero unit vector for a third time period comprises:
- controlling, using the controller, the first inverter using a first zero unit vector for a first half of the third time period;
- controlling, using the controller, the second inverter using a second zero unit vector for the first half of the third time period;
- controlling, using the controller, the first inverter using the second zero unit vector for a second half of the third time period; and
- controlling, using the controller, the second inverter using the first zero unit vector for the second half of the second time period.

10. The method of claim 7, further comprising:
- filtering, using a plurality of coupling inductors, each phase of a three-phase output of the paralleled inverter circuit; and
- providing the three-phase output of the paralleled inverter circuit to drive an alternating current load.

* * * * *